United States Patent
Wang et al.

(10) Patent No.: US 11,127,298 B2
(45) Date of Patent: Sep. 21, 2021

(54) INTERSECTION SPEED DECIDING METHOD AND SYSTEM THEREOF

(71) Applicant: Automotive Research & Testing Center, Changhua County (TW)

(72) Inventors: Cheng-Hsien Wang, Changhua County (TW); Tsung-Ming Hsu, Changhua County (TW); Yu-Rui Chen, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 160 days.

(21) Appl. No.: 16/677,616

(22) Filed: Nov. 7, 2019

(65) Prior Publication Data
US 2021/0142674 A1    May 13, 2021

(51) Int. Cl.
G08G 1/16      (2006.01)
H04W 4/40     (2018.01)
G08G 1/052    (2006.01)
G08G 1/01      (2006.01)

(52) U.S. Cl.
CPC .......... *G08G 1/166* (2013.01); *G08G 1/0125* (2013.01); *G08G 1/052* (2013.01); *H04W 4/40* (2018.02)

(58) Field of Classification Search
CPC ........ G08G 1/166; G08G 1/161; G08G 1/165; G08G 1/167; G08G 1/168; G08G 1/0125; G08G 1/052; H04W 4/40
See application file for complete search history.

(56) References Cited

U.S. PATENT DOCUMENTS

| | | | | |
|---|---|---|---|---|
| 5,926,114 | A * | 7/1999 | Andrews | G08G 1/164 340/909 |
| 9,564,050 | B2 * | 2/2017 | Krijger | G08G 1/0129 |
| 9,691,278 | B2 * | 6/2017 | Poornachandran | G08G 1/096716 |
| 10,019,896 | B2 * | 7/2018 | Krijger | G08G 1/0145 |
| 10,121,370 | B2 * | 11/2018 | Elsheemy | G08G 1/0141 |
| 10,217,356 | B2 * | 2/2019 | Baller | G08G 1/087 |
| 10,388,154 | B1 * | 8/2019 | Kuzikov | G08G 1/012 |
| 10,446,025 | B2 * | 10/2019 | Yu | G08G 1/081 |
| 10,497,259 | B2 * | 12/2019 | Liu | G08G 1/0145 |
| 10,964,207 | B2 * | 3/2021 | Mobasser | G08G 1/0145 |

(Continued)

OTHER PUBLICATIONS

Ismail H. Zohdy et al., "Intersection Management for Autonomous Vehicles using iCACC", 15th International IEEE Conference on Intelligent Transportation Systems, dated on Sep. 16-19, 2012, pp. 1109-1114, United States.

*Primary Examiner* — Hoi C Lau
(74) *Attorney, Agent, or Firm* — CKC & Partners Co., LLC

(57) ABSTRACT

An intersection speed deciding method includes a dataset obtaining and calculating step and a speed adjusting step. At least one of the vehicles expected to pass through one of the points is defined as the approaching vehicle, and a first arrival time of the approaching vehicle is obtained. Whether a preceding vehicle is on the host route is judged. If yes, a second arrival time of the preceding vehicle is obtained. Whether the host vehicle is expected to wait for a red light is judged. If yes, a red light duration is obtained. A time difference exists between a best arrival time and a corresponding expected arrival time, and each time difference is minimized based on the first arrival time, the second arrival time and the red time duration. A speed of the host vehicle is adjusted or remained based on the expected arrival times.

12 Claims, 5 Drawing Sheets

(56) References Cited

U.S. PATENT DOCUMENTS

| | | | |
|---|---|---|---|
| 2009/0005984 A1* | 1/2009 | Bradley | G01C 21/20 701/469 |
| 2010/0191449 A1* | 7/2010 | Iwamoto | G08G 1/08 701/118 |
| 2011/0184642 A1* | 7/2011 | Rotz | G01C 21/3469 701/533 |
| 2012/0139754 A1* | 6/2012 | Ginsberg | G08G 1/096775 340/905 |
| 2014/0210645 A1* | 7/2014 | Sharma | G08G 1/07 340/907 |
| 2015/0015421 A1* | 1/2015 | Krijger | G08G 1/096716 340/932 |
| 2015/0243165 A1* | 8/2015 | Elsheemy | B60R 25/00 340/906 |
| 2016/0328968 A1* | 11/2016 | Elsheemy | B60T 7/18 |
| 2017/0148314 A1* | 5/2017 | Krijger | G08G 1/0129 |
| 2018/0215386 A1* | 8/2018 | Naserian | G08G 1/096783 |
| 2018/0293884 A1* | 10/2018 | Liu | G08G 1/0112 |
| 2019/0009783 A1* | 1/2019 | Kawasaki | G01C 21/3655 |
| 2020/0160701 A1* | 5/2020 | Mobasser | G08G 1/0112 |
| 2020/0365033 A1* | 11/2020 | Cheng | G08G 1/096791 |
| 2021/0142674 A1* | 5/2021 | Wang | G08G 1/0125 |

* cited by examiner

INTERSECTION SPEED DECIDING METHOD AND SYSTEM THEREOF

BACKGROUND

Technical Field

The present disclosure relates to a speed deciding method and a system thereof. More particularly, the present disclosure relates to an intersection speed deciding method and a system thereof for passing through an intersection.

Description of Related Art

In general, many vehicles turn or come toward each other at intersections or road junctions. A driver has to decide when to accelerate, decelerate or remain a constant speed while passing through the intersections. Once the judgement of the driver is wrong, traffic accidents happen. According to the statistics in the United States, 40% traffic accidents happened at intersections or road junctions in 2008. According to the Federal Statistical Office of Germany, 47.5% traffic accidents happened at intersections or road junctions in 2013. Moreover, in other countries, more than 98% traffic accidents happened at intersections or road junctions.

In order to solve the problem, some practitioners develop automatic deciding strategies for automated vehicles to pass through an intersection to reduce the wrong driving decisions. Automatic deciding strategies for automated vehicles to pass through the intersection can be divided into two kinds: decisions based on a Vehicle to Everything (V2X) communication system and decisions without the V2X communication system. In the former, the V2X communication system is acted as a manager to control all the vehicles to pass through the intersection efficiently; however, the system fails when the devices or equipment of the V2X communication system are broken. On the contrary, in the latter, how to pass through the intersection safely is the main consideration, but how to pass through the intersection efficiently is not considered.

Based on the above mentioned, how to improve the deciding method and system thereof to allow the vehicles to pass through the intersection safely and efficiently becomes a pursuit target for practitioners.

SUMMARY

According to one aspect of the present disclosure, an intersection speed deciding method which is applied to allow a host vehicle to pass through an intersection safely is provided. The host vehicle is expected to pass one or more points of the intersection along a host route. The intersection speed deciding method includes a dataset obtaining and calculating step and a speed adjusting step. In the dataset obtaining and calculating step, at least one approaching vehicle is defined. One or more vehicles are going to pass through the intersection, and at least one of the one or more vehicles expected to pass through at least one of the one or more points is defined as the at least one approaching vehicle. At least one first arrival time that the at least one approaching vehicle is expected to pass through the at least one of the one or more points is obtained. Whether a preceding vehicle is in the host route is judged. If yes, at least one second arrival time that the preceding vehicle is expected to pass through at least one of the one or more points is obtained. Whether the host vehicle is expected to wait for a red light is judged. If yes, a red light duration is obtained. The host vehicle has a best arrival time and an expected arrival time for each of the one or more points. A time difference exists between each of the best arrival times and the corresponding expected arrival time, and each of the time differences is minimized based on the at least one first arrival time, the at least one second arrival time and the red time duration. In the speed adjusting step, a speed of the host vehicle is adjusted or remained based on the expected arrival times.

According to another aspect of the present disclosure, an intersection speed deciding system which is applied to the intersection speed deciding method of the aforementioned aspect is provided. The intersection speed deciding system includes a controlling unit and a receiver. The controlling unit is disposed at the host vehicle. The receiver is disposed at the host vehicle and is signally connected to the controlling unit. The receiver is configured for receiving an environment signal from a V2X communication system, and the environment signal includes the at least one first arrival time, the at least one second arrival time and the red time duration.

According to another aspect of the present disclosure, an intersection speed deciding system which is applied to the intersection speed deciding method of the aforementioned aspect is provided. The intersection speed deciding system includes a controlling unit and at least one sensor. The controlling unit is disposed at the host vehicle. The at least one sensor is disposed at the host vehicle and is signally connected to the controlling unit. The at least one sensor detects the one or more vehicles, the preceding vehicle and the red light to allow the controlling unit to obtain the at least one first arrival time, the at least one second arrival time and the red time duration.

BRIEF DESCRIPTION OF THE DRAWINGS

The disclosure can be more fully understood by reading the following detailed description of the embodiments, with reference made to the accompanying drawings as follows.

DETAILED DESCRIPTION

It will be understood that when an element (or mechanism or module) is referred to as be "disposed on", "connected to" or "coupled to" another element, it can be directly disposed on, connected or coupled to the other element, or it can be indirectly disposed on, connected or coupled to the other element, that is, intervening elements may be present. In contrast, when an element is referred to as be "directly disposed on", "directly connected to" or "directly coupled to" another element, there are no intervening elements present.

In addition, the terms first, second, third, etc. is used herein to describe various elements or components, these elements or components should not be limited by these terms. Consequently, a first element or component discussed below could be termed a second element or component.

Figure 1:
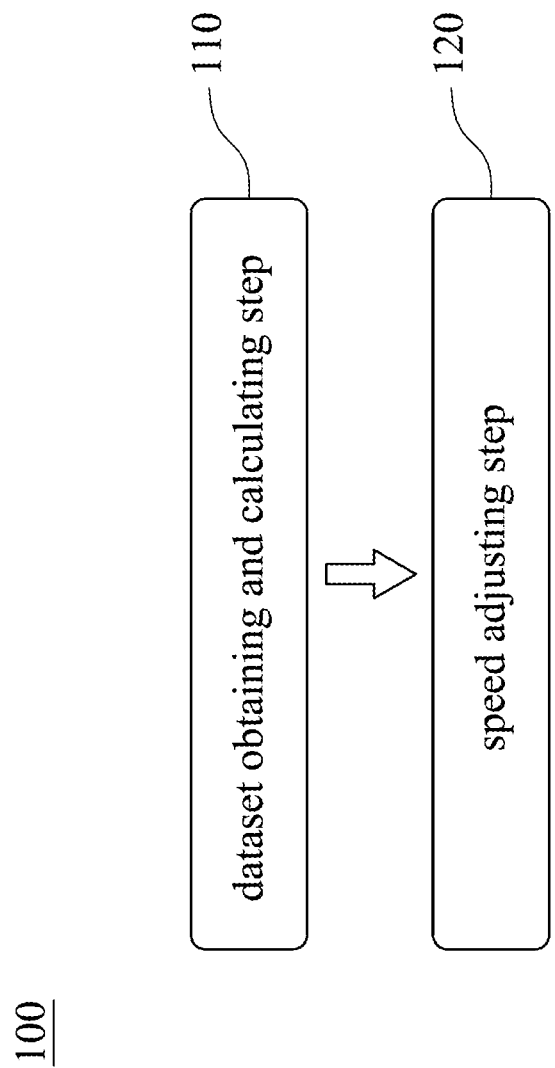
FIG. 1 shows a block diagram of an intersection speed deciding method according to one embodiment of the present disclosure.

FIG. 1 shows a block diagram of an intersection speed deciding method 100 according to one embodiment of the present disclosure. The intersection speed deciding method 100 is applied to allow a host vehicle to pass through the intersection safely. The host vehicle is expected to pass one or more points of the intersection along a host route. The intersection speed deciding method 100 includes a dataset obtaining and calculating step 110 and a speed adjusting step 120.

In the dataset obtaining and calculating step 110, at least one approaching vehicle is defined. Precisely, one or more vehicles are going to pass through the intersection and at least one of the one or more vehicles expected to pass through at least one of the one or more points is defined as the at least one approaching vehicle. At least one first arrival time that the at least one approaching vehicle is expected to pass through the at least one of the one or more points is obtained. Whether a preceding vehicle is on the host route is judged. If yes, at least one second arrival time that the preceding vehicle is expected to pass through at least one of the one or more points is obtained. Whether the host vehicle is expected to wait for a red light is judged. If yes, a red light duration is obtained. The host vehicle has a best arrival time and an expected arrival time for each of the one or more points. A time difference exists between each of the best arrival times and the corresponding expected arrival time, and each of the time differences is minimized based on the at least one first arrival time, the at least one second arrival time and the red time duration.

In the speed adjusting step 120, a speed of the host vehicle is adjusted or remained based on the expected arrival times.

Hence, consideration of the first arrive times of the approaching vehicles passing through the points, the second arrive time of the preceding vehicle passing through the points and the red light duration assists the host vehicle to pass through the intersection safely, and minimization of the time differences assists the host vehicle to pass through the intersection efficiently. The details of the intersection speed deciding method 100 will be described in the following paragraphs.

Figure 2:
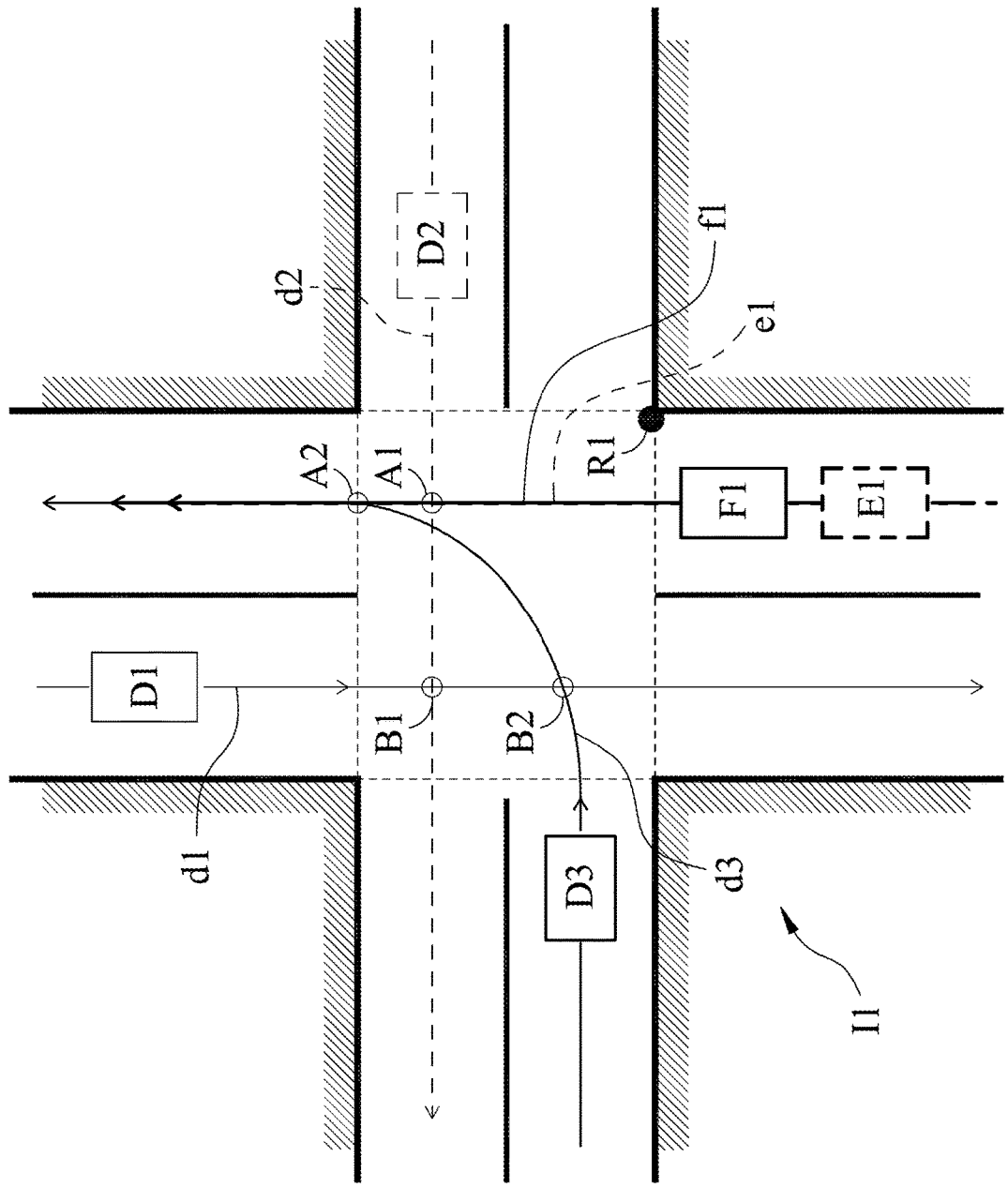
FIG. 2 shows an application of the intersection speed deciding method of FIG. 1 at an intersection.

FIG. 2 shows an application of the intersection speed deciding method 100 of FIG. 1 at an intersection 11. The intersection 11 is cross-shaped. The intersection 11 has four points A1, A2, B1, B2. Each of the points A1, A2, B1, B2 indicates a possible collision point for the vehicles passing through the intersection 11, and the host vehicle E1 may only pass some of them, i.e., the points A1, A2. Coordinates of the four points A1, A2, B1, B2 may be record in a map dataset, the map dataset can include coordinate of a stop line or other traffic lines, and can also include speed limitations or other information. The host vehicle E1 can load the map dataset in advance. In other embodiments, the intersection 11 can be, but not limited to, Y-shaped or T-shaped.

Additionally, in the dataset obtaining and calculation step 110, the host vehicle E1 can receive an environment signal by a receiver, and the environment signal can include the at least one first arrival time, the at least one second arrival time and the red time duration. The environment signal can be provided to the host vehicle E1 by a V2X communication system in real time. With the receiver receiving the environmental signal from the V2X communication system, the host vehicle E1 can directly obtain all the datasets in time, which facilitates for latter calculation. The map dataset can also be obtained via the V2X communication system. In other embodiments, the host vehicle can obtain the at least one first arrival time, the at least one second arrival time and the red time duration via at least one sensor; consequently, there is no need to receive the environment signal. The host vehicle can also, but not limited to, obtain all the datasets by the sensor once the V2X communication system fails.

Based on the map dataset and the environmental signal, the following datasets can be obtained. For example, the host vehicle E1 has a host route e1, and the host vehicle E1 is expected to pass through the points A1, A2 without passing through the points B1, B2. A number of vehicles D1, D2, D3 is three. The vehicle D1 has an approaching route d1 and is expected to pass through the points B1, B2. The vehicle D2 has an approaching route d2 and is expected to pass through the points A1, B1. The vehicle D3 has an approaching route d3 and is expected to pass through the points B2, A2. Since each of the vehicles D2, D3 is expected to pass through at least one of the points A1, A2 that the host vehicle E1 is expected to pass, each of the vehicles D2, D3 can be defined as the approaching vehicle. A preceding vehicle F1 having a preceding route f1 is followed by the host vehicle E1 and is expected to pass through the points A1, A2.

In general, a maximum speed limit is applied on each lane, and the host vehicle E1 can pass through the points A1, A2 of the intersection 11 with the speed equal to the maximum speed limit as long as the vehicles D1-D3, the preceding vehicle F1 and the red light R1 are absent. Under such situation, the time that the host vehicle E1 is expected to pass through the points A1, A2 without other influence can be defined as the best arrival time. On the contrary, the host vehicle E1 will be affected by the vehicles D1-D3, the preceding vehicle F1 and the red light R1 such that the time that the host vehicle E1 is expected to pass through the points A1, A2 will become longer. In order to pass through the intersection 11 safely, collisions between the host vehicle E1 and the approaching vehicles D2, D3 at the points A1, A2 have to be prevented, and a safe distance has to be remained between the host vehicle E1 and the preceding vehicle F1. Additionally, the host vehicle E1 has to wait for the red light duration as long as the red light R1 is presented. All the reasons will delay the host vehicle E1 to pass the intersection 11.

In order to pass through the intersection 11 efficiently, the time that the host vehicle E1 passes through the intersection 11 has to approach the best arrival time while satisfying the above situations. Hence, an initial expected arrival time for passing through each of the points A1, A2 can be set, and then minimize the time difference, i.e., the difference between the expected arrival time and the corresponding best arrival time, by varying the expected arrival time. Finally, the host vehicle E1 will accelerate or decelerate based on the expected arrival time to allow the actual time that the host vehicle E1 actually pass through the intersection 11 to be equal to the expected arrival time.

Therefore, equations (1) to (4) can be applied.

$$\min_{AT_i, i=1,\ldots,W} \sum_{i=1}^{W} |AT_i - OT_i|; \tag{1}$$

subject to $$|(OT_i + |AT_i - OT_i|) - AT_j I_{jw}| \geq \Delta t_w I_{jw} \tag{2};$$

$$(OT_i + |AT_i - OT_i|) - \Delta T_k I_{kF} \geq \Delta t_F I_{kF} \tag{3}; \text{ and}$$

$$OT_i + |AT_i - OT_i| - t_{redlight} I_{redlight} \quad (4).$$

i is an integer between 1 to W. W represents a number of the points A1, A2 on the host route e1. $OT_i$ represents each of the best arrival times. $AT_i$ presents each of the expected arrival times. w is an integer between 1 to W. $I_{jw}$ represents an event corresponding to each of the vehicles D1, D2, D3. $I_{jw}=1$ is given to the approaching vehicles D2, D3, and $I_{jw}=0$ is given to the others of the vehicles D1-D3 not expected to passing through at least one of the points A1, A2. $AT_j$ represents the at least one first arrival time. $I_{kF}$ represents an event corresponding to the preceding vehicle F1. $I_{kF}=1$ as long as the preceding vehicle F1 is presented, and $I_{kF}=0$ as long as the preceding vehicle F1 is absent. $t_{redlight}$ represents the red time duration. $I_{redlight}$ represents an event corresponding to the red light R1. $I_{redlight}=1$ as long as the host vehicle is expected to wait for the red light R1, and $I_{redlight}=0$ as long as the host vehicle E1 is not expected to wait for the red light R1. $\Delta t_w$ and $\Delta t_F$ represent a first interval time and a second interval time, respectively.

$\Delta t_w = \max(L_i, L_j)/V_i$ and $\Delta t_F \max(L_i, L_F)/V_i$ can be set, where $L_i$ represents a length of the host vehicle E1; $L_j$ represents a length of the approaching vehicles D2, D3; $L_F$ represents a length of the preceding vehicle F1; $V_i$ represents the speed of the host vehicle E1. In other embodiments, a constant can be given to each of $\Delta t_w$ and $\Delta t_F$ such that $\Delta t_w$ and $\Delta t_F$ will not be changed according to the speed. $\Delta t_w$ can be identical to $\Delta t_F$. The first interval time and a second interval time can be adjusted on demand, and will not be limited thereto.

In the embodiment of FIG. 2, since the host vehicle E1 is expected to pass through the points A1, A2 of the intersection 11, W is set to 2. The best arrival time and the expected arrival time that the host vehicle E1 is expected to pass through the point A1 are represented by $OT_1$ and $AT_1$, respectively. The best arrival time and the expected arrival time that the host vehicle E1 is expected to pass through the point A2 are represented by $OT_2$ and $AT_2$, respectively.

Since the vehicle D1 is expected to pass through the points B1, B2 without passing through the points A1, A2, the vehicle D1 cannot be defined as the approaching vehicle, and $I_{j1}=1=I_{j2}=1$ is given to the points A1, A2 such that the vehicle D1 will not affect the expected arrival times of the host vehicle E1 for passing through the points A1, A2.

Since the approaching vehicle D2 is expected to pass through the points A1, B1, $I_{j1}=1$ is given to the point A1 and $I_{j2}=0$ is given to the point A2. Hence, only the first arrival time $(AT_j)$ that the approaching vehicle D2 is expected to pass through the point A1 will affect the expected arrival time that the host vehicle E1 is expected to pass through the point A1 owing to $I_{j1}=1$, and the expected arrival time that the host vehicle E1 is expected to pass through the point A2 will not be affected by the approaching vehicle D2.

Since the approaching vehicle D3 is expected to pass through the points B2, A2, $I_{j1}=0$ is given to the point A1 and $I_{j2}=1$ is given to the point A2. Hence, only the first arrival time $(AT_j)$ that the approaching vehicle D3 is expected to pass through the point A2 will affect the expected arrival time that the host vehicle E1 is expected to pass through the point A2 owing to $I_{j2}=1$, and the expected arrival time that the host vehicle E1 is expected to pass through the point A1 will not be affected by the approaching vehicle D3.

When the host vehicle E1 is expected to pass through the points A1, A2, the preceding vehicle F1 is presented. Consequently, $I_{kF}=1$ is given to the points A1, A2. Hence, the first arrival time $(AT_k)$ that the preceding vehicle F1 is expected to pass through the point A1 will affect the expected arrival time that the host vehicle E1 is expected to pass through the point A1 owing to $I_{kF}=1$, and the first arrival time $(AT_k)$ that the preceding vehicle F1 is expected to pass through the point A2 will affect the expected arrival time that the host vehicle E1 is expected to pass through the point A2 owing to $I_{kF}=1$.

Table 1 shows the values of $I_{jw}$ for each of the vehicles D1, D2, D3 corresponding to the points A1, A2, and Table 2 shows the values of $I_{kF}$ for the preceding vehicle F1 corresponding to the points A1, A2.

TABLE 1

|  | D1 | D2 | D3 |
|---|---|---|---|
| point A1 ($I_{j1}$) | 0 | 1 | 0 |
| point A2 ($I_{j2}$) | 0 | 0 | 1 |

TABLE 2

| point A1 ($I_{kF}$) | 1 |
|---|---|
| point A2 ($I_{kF}$) | 1 |

When minimizing the time differences, the absolute value of the time difference corresponding to the point A1, i.e., $|AT_1 - OT_1|$, can be minimized first. Meanwhile, if the host vehicle E1 has to wait for the red light R1, the expected arrival time that the host vehicle E1 is expected to pass through the point A1 will be affected by the red light duration, the first arrival time that the approaching vehicle D2 is expected to pass through the point A1, and the second arrival time that the preceding vehicle F1 is expected to pass through the point A1. Subsequently, minimize the absolute value of the time difference corresponding to the point A2, i.e., $|AT_2 - OT_2|$, and the expected arrival time that the host vehicle E1 is expected to pass through the point A2 will be affected by the first arrival time that the approaching vehicle D3 is expected to pass through the point A2, and the second arrival time that the preceding vehicle F1 is expected to pass through the point A2. As a result, the host vehicle E1 can, under a safety principle, pass through the intersection 11 within a time that approaches the best arrival time.

In one situation, in order to increase the safety for passing through the intersection, the host vehicle is better to yield to a straight vehicle when turning. Hence, in the dataset obtaining and calculating step, it is better to judge whether the host vehicle is turning or not. If the host vehicle E1 is turning, one of the at least one approaching vehicle expected to go straight is defined as a straight vehicle. A third arrival time is defined as the first arrival time of the straight vehicle, and each of the time differences is minimized based on the at least one first arrival time, the at least one second arrival time, the third arrival time and the red time duration.

In one embodiment, a controlling unit of the host vehicle can receive a turning signal which may, for example, come from a direction indicator to judge whether the host vehicle is turning or not. In other embodiments, the host vehicle can employ a GPS, and whether the host vehicle is turning can be judged based on GPS coordinates.

Figure 3:
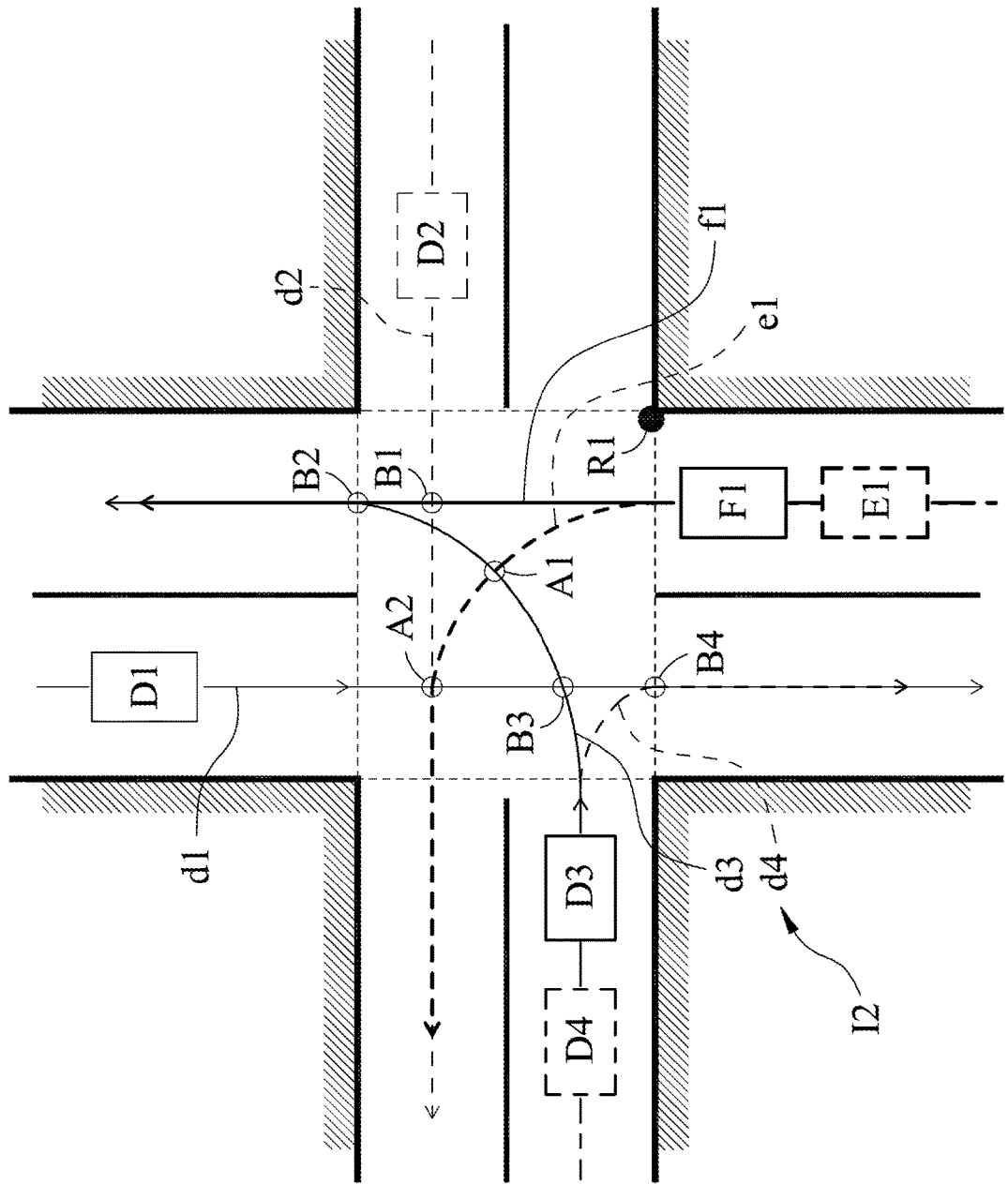
FIG. 3 shows another application of the intersection speed deciding method of FIG. 1 at another intersection.

FIG. 3 shows another application of the intersection speed deciding method 100 of FIG. 1 at another intersection 12. The intersection 12 is cross-shaped. The intersection 12 has six points A1, A2, B1, B2, B3, B4. The host vehicle E1 has a host route e1, and the host vehicle E1 is expected to pass through the points A1, A2 without passing through the points B1, B2, B3, B4. A number of vehicles D1, D2, D3, D4 is four. The vehicle D1 has an approaching route d1 and is expected to pass through the points A2, B3, B4. The vehicle D2 has an approaching route d2 and is expected to pass through the points B1, A2. The vehicle D3 has an approaching route d3 and is expected to pass through the points B3, A1, B2. The vehicle D4 has an approaching route d4 and is expected to pass through the point B4. Since each of the vehicles D1, D2, D3 is expected to pass through at least one of the points A1, A2 that the host vehicle E1 is expected to pass, each of the vehicles D1, D2, D3 can be defined as the approaching vehicle. A preceding vehicle F1 having a preceding route f1 is followed by the host vehicle E1 and is expected to pass through the points B1, B2.

Therefore, equations (5) to (9) can be applied.

$$\min_{AT_i, i=1,\ldots,W} \sum_{i=1}^{W} |AT_i - OT_i|; \quad (5)$$

subject to $$|(OT_i + |AT_i - OT_i|) - AT_j I_{jw}| \geq \Delta t_w I_{jw} \quad (6);$$

$$(OT_i + |AT_i - OT_i|) - AT_k I_{kF} \geq \Delta t_F I_{kF} \quad (7);$$

$$(OT_i + |AT_i - OT_i|) - AT_p I_p \geq 0 \quad (8); \text{ and}$$

$$OT_i + |AT_i - OT_i| - t_{redlight} i_{redlight} \geq 0 \quad (9).$$

$I_{jw}$ represents an event corresponding to each of the vehicles D1, D2, D3, D4. $I_{jw}=1$ is given to one of the approaching vehicles D1, D2, D3 which is not going straight, and $I_{jw}=0$ is given to the straight vehicles D1, D2 and the others of the vehicles D1, D2, D3, D4 not expected to passing through at least one of the points A1, A2. $I_p$ represents an event corresponding to the straight vehicles D1, D2. $I_p=1$ as long as the straight vehicles D1, D2 are presented, and $I_p=0$ as long as the straight vehicles D1, D2 are absent. $AT_p$ represents the third arrival time.

In the embodiment of FIG. 3, since the host vehicle E1 is expected to pass through the points A1, A2 of the intersection 12, W is set to 2. The best arrival time and the expected arrival time that the host vehicle E1 is expected to pass through the point A1 are represented by $OT_1$ and $AT_1$, respectively. The best arrival time and the expected arrival time that the host vehicle E1 is expected to pass through the point A2 are represented by $OT_2$ and $AT_2$, respectively.

Since the approaching vehicle D1 is expected to pass through the points A2, B3, B4 without passing through the point A1, and the approaching route d1 of the approaching vehicle D1 is straight, the approaching vehicle D1 can be defined as a straight vehicle. $I_p=1$ is given to the point A2. $I_{j1}=I_p=0$ is given to the point A1 and $I_{j2}=0$ is given to the point A2. Hence, only the third arrival time ($AT_p$) which is equal to the first arrival time that the approaching vehicle D1 is expected to pass through the point A2 will affect the expected arrival time that the host vehicle E1 is expected to pass through the point A2 owing to $I_p=1$ for the point A2, and the expected arrival time that the host vehicle E1 is expected to pass through the point A1 will not be affected by the approaching vehicle D1.

Since the approaching vehicle D2 is expected to pass through the points B1, A2 without passing through the point A1, and the approaching route d2 of the approaching vehicle D2 is straight, the approaching vehicle D2 can be defined as a straight vehicle. $I_p=1$ is given to the point A2. $I_{j1}=I_p=0$ is given to the point A1 and $I_{j2}=0$ is given to the point A2. Hence, only the third arrival time ($AT_p$) which is equal to the first arrival time that the approaching vehicle D2 is expected to pass through the point A2 will affect the expected arrival time that the host vehicle E1 is expected to pass through the point A2 owing to $I_p=1$ for the point A2, and the expected arrival time that the host vehicle E1 is expected to pass through the point A1 will not be affected by the approaching vehicle D2.

Since the approaching vehicle D3 is expected to pass through the points B3, A1, B2 without passing through the point A2, and the approaching route d3 of the approaching vehicle D3 is not straight, the approaching vehicle D3 cannot be defined as a straight vehicle. Thus, $I_{j1}=1$ is given to the point A1. $I_{j2}=I_p=0$ is given to the point A2 and $I_p=0$ is given to the point A1. Hence, only the first arrival time ($AT_j$) that the approaching vehicle D3 is expected to pass through the point A1 will affect the expected arrival time that the host vehicle E1 is expected to pass through the point A1 owing to $I_{j1}=1$, and the expected arrival time that the host vehicle E1 is expected to pass through the point A2 will not be affected by the approaching vehicle D3.

Since the vehicle D4 is expected to pass through the point B4 without passing through the points A1, A2, the vehicle D4 cannot be defined as an approaching vehicle. Moreover, the approaching route d4 of the vehicle D4 is not straight, the vehicle D4 cannot be defined as a straight vehicle. $I_{j1}=0$, $I_{j2}=0$ and $I_p=0$ are given to the points A1, A2 such that the vehicle D4 will not affect the expected arrival times of the host vehicle E1 for passing through the points A1, A2.

When the host vehicle E1 is expected to pass through the point A1, the preceding vehicle F1 is presented; consequently, $I_{kF}=1$ is given to the point A1. Additionally, when the host vehicle E1 is expected to pass through the point A2, the preceding vehicle F1 is absent; consequently, $I_k=0$ is given to the point A2. Hence, the first arrival time ($AT_k$) that the preceding vehicle F1 is expected to pass through the point A1 will affect the expected arrival time that the host vehicle E1 is expected to pass through the point A1 owing to $I_{kF}=1$ for the point A1, and the first arrival time ($AT_k$) that the preceding vehicle F1 is expected to pass through the point A2 will not affect the expected arrival time that the host vehicle E1 is expected to pass through the point A2 owing to $I_{kF}=0$ for the point A2.

Table 3 shows the values of $I_{jw}$ and $I_p$ for each of the vehicles D1, D2, D3, D4 corresponding to the points A1, A2, and Table 4 shows the values of $I_k$ for the preceding vehicle F1 corresponding to the points A1, A2.

TABLE 3

|  | D1 | D2 | D3 | D4 |
|---|---|---|---|---|
| point A1 ($I_{j1}$) | 0 | 0 | 1 | 0 |
| point A1 ($I_p$) | 0 | 0 | 0 | 0 |
| point A2 ($I_{j2}$) | 0 | 0 | 0 | 0 |
| point A2 ($I_p$) | 1 | 1 | 0 | 0 |

TABLE 4

| point A1 ($I_{kF}$) | 1 |
|---|---|
| point A2 ($I_{kF}$) | 0 |

When the time differences are minimized, the absolute value of the time difference corresponding to the point A1, i.e., $|AT_1-OT_1|$, can be minimized first. Meanwhile, if the host vehicle E1 has to wait for the red light R1, the expected arrival time that the host vehicle E1 is expected to pass through the point A1 will be affected by the red light duration, the first arrival time that the approaching vehicle D3 is expected to pass through the point A1, and the second arrival time that the preceding vehicle F1 is expected to pass through the point A1. Subsequently, the absolute value of the time difference corresponding to the point A2, i.e., $|AT_2-OT_2|$ is minimized and the expected arrival time that the host vehicle E1 is expected to pass through the point A2 will be affected by the third arrival times which are equal to the first arrival times that the approaching vehicles D1, D2 are expected to pass through the point A2. As a result, the host vehicle E1 can, under a safety principle, pass through the intersection 12 within a time that approaches the best arrival time.

In the speed adjusting step 120, as long as the expected arrival time of one of the points A1, A2 is larger than the corresponding best arrival time, the host vehicle E1 decelerates at 10.58 km/(hr·s) until the host vehicle E1 has passed through one of the points A1, A2 or until the speed of the host vehicle E1 becomes zero. In other words, when the expected arrival time is larger than the best arrival time, it follows that the original speed of the host vehicle E1 is too fast, and the speed has to be slowed down. Since the driver may feel uncomfortable owing to high deceleration, the host vehicle E1 is better to decelerate at 10.58 km/(hr·s) which is equal to 0.3 g (gravity). After passing through the point A1, the speed of the host vehicle E1 will be adjusted according to the expected arrival time of the point A2. In one situation, when the speed becomes zero, the host vehicle E1 stops and wait till end of the expected arrival time. In other embodiments, the host vehicle can decelerate based on the original speed of the host vehicle, the expected arrival time and the distance between the current point and the next point, and the present disclosure is not limited thereto.

Figure 4:
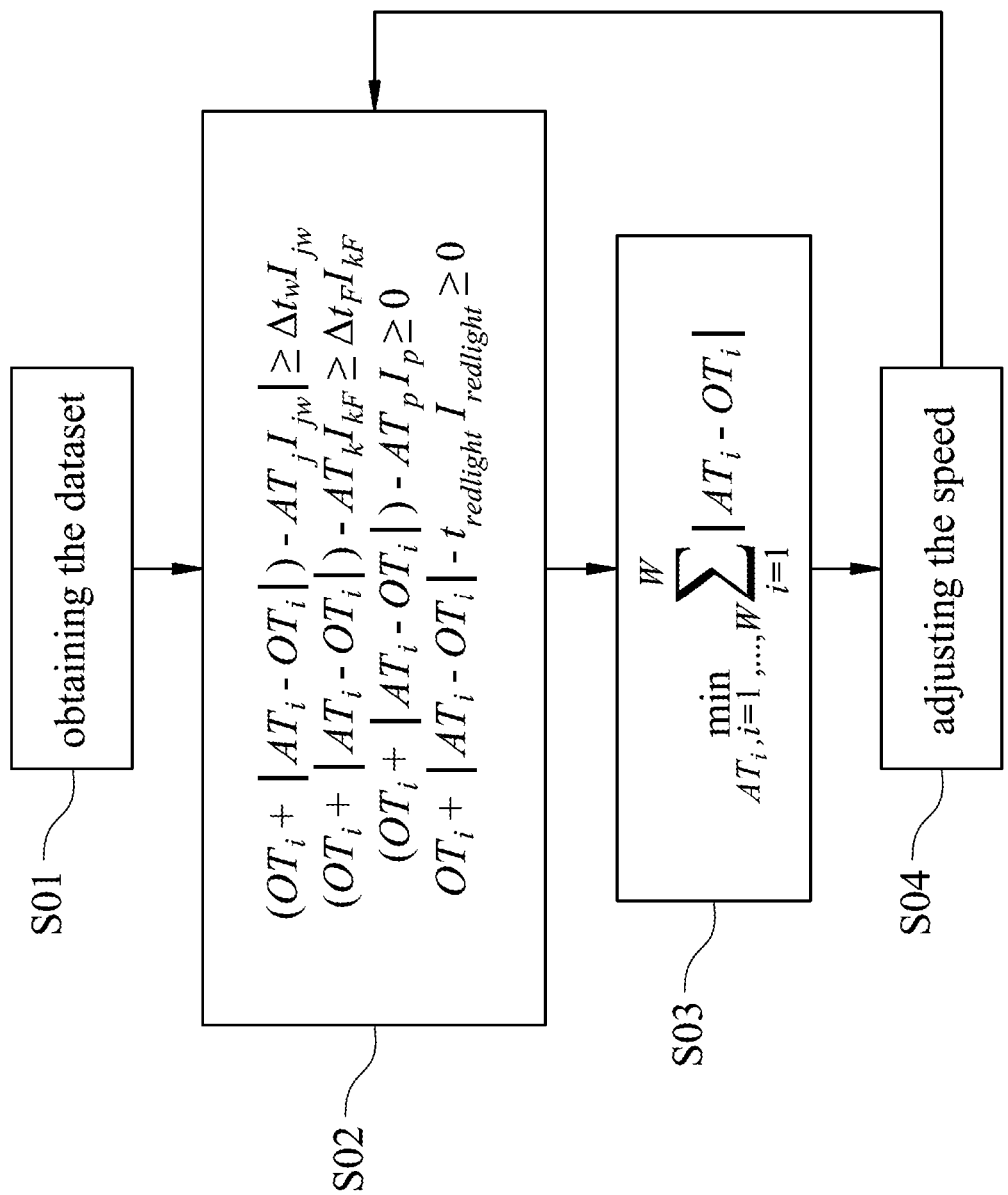
FIG. 4 shows a flow chart of the intersection speed deciding method of FIG. 1.

FIG. 4 shows a flow chart of the intersection speed deciding method 100 of FIG. 1. When beginning, Step S01 can be executed by the host vehicle to obtain the dataset. Preferably, in the dataset obtaining and calculating step 110, the host vehicle starts to obtain the at least one first arrival time, the at least one second arrival time, the third arrival time and the red time duration 200 m from the intersection. As a result, there will be enough reacting time for the host vehicle to pass through the intersection safely.

Subsequently, Step S02 is executed. Each approaching route of each approaching vehicle, each first arrival time, each second arrival time, each third arrival time and each red light duration will be substituted into the equations (6)-(9), and then Step S03 can be executed to minimize the time difference as shown in equation (5), subject to equations (6)-(9).

After getting the expected arrival time, Step S04 is executed to adjust the speed of the host vehicle, and Step S02 is executed again for the next point.

Figure 5:
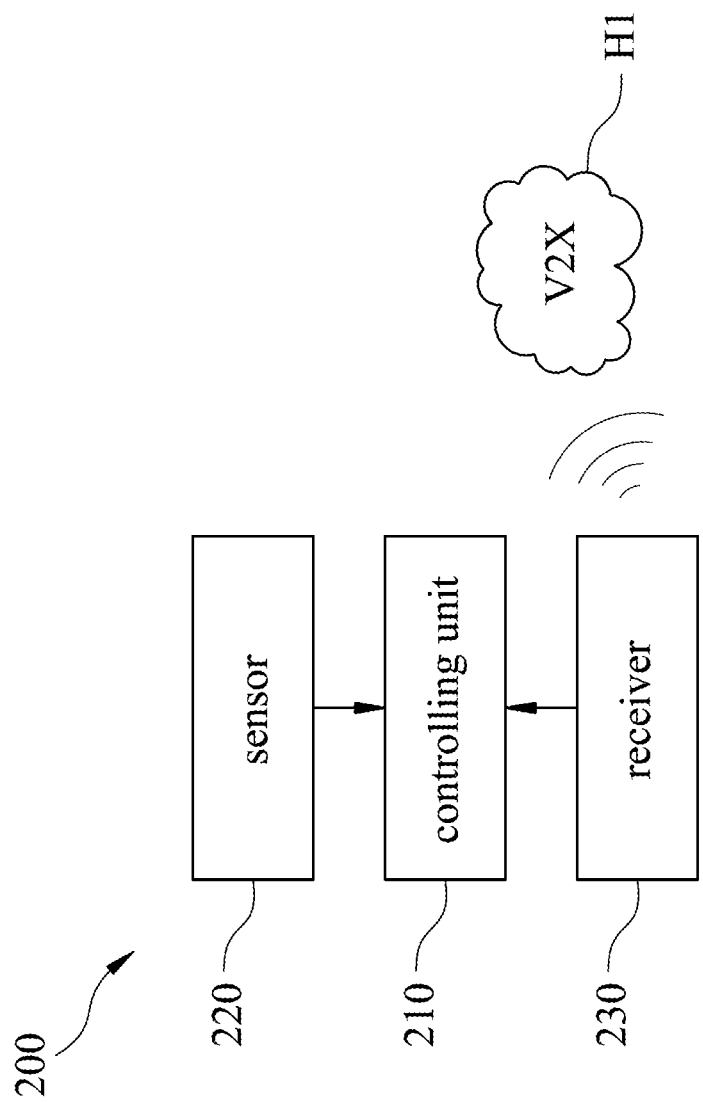
FIG. 5 shows a block diagram of an intersection speed deciding system according to another embodiment of the present disclosure.

FIG. 5 shows a block diagram of an intersection speed deciding system 200 according to another embodiment of the present disclosure. The intersection speed deciding system 200 is applied to the intersection speed deciding method 100 of FIG. 1 and includes a controlling unit 210 and a receiver 230. The controlling unit 210 is disposed at the host vehicle. The receiver 230 is disposed at the host vehicle and is signally connected to the controlling unit 210. The receiver 230 is configured for receiving an environment signal from a V2X communication system H1, and the environment signal includes the at least one first arrival time, the at least one second arrival time and the red time duration.

The intersection speed deciding system 200 can further include at least one sensor 220. The at least one sensor 220 is disposed at the host vehicle and is signally connected to the controlling unit 210. The at least one sensor 220 detects the at least one approaching vehicles, the preceding vehicle and the red light to allow the controlling unit 210 to obtain the at least one first arrival time, the at least one second arrival time and the red time duration.

The host vehicle can obtain the datasets of the vehicles by receiving the environment signal from the V2X communication system H1. The host vehicle can also detects the coordinates and the speed of the approaching vehicles by the at least one sensor 220 to allow the controlling unit 210 to obtain the approaching route of the approaching vehicles and to calculate the first arrival time and the second arrival time. A number of the at least one sensor 220 can be more than one, and the type of the at least one sensor 220 can be various. For example, the type of the sensor 220 can be, but not limited to, a long range radar, a short range radar, a long range camera or a short range camera. The long range radar or the short range radar can be employed to detect the distance between the approaching vehicle and the host vehicle, and the long range camera or the short range camera can be employed to shoot the red light and the red light duration.

It is selectable for the host vehicle to receive the datasets from the V2X communication system H1 or to obtain the datasets from the at least one sensor 220. In other embodiments, the host vehicle receives the datasets from the V2X communication system H1, and obtains the datasets from the at least one sensor 220 as long as the V2X communication system H1 is failed.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. An intersection speed deciding method, which is applied to allow a host vehicle to pass through an intersection safely, the host vehicle being expected to pass one or more points of the intersection along a host route, the intersection speed deciding method comprising:

a dataset obtaining and calculating step, comprising:
defining at least one approaching vehicle, wherein one or more vehicles are expected to pass through the intersection, at least one of the one or more vehicles expected to pass through at least one of the one or more points is defined as the at least one approaching vehicle, and at least one first arrival time that the at least one approaching vehicle is expected to pass through the at least one of the one or more points is obtained;

judging whether a preceding vehicle is on the host route, if yes, obtaining at least one second arrival time that the preceding vehicle is expected to pass through at least one of the one or more points;

judging whether the host vehicle is expected to wait for a red light, if yes, obtaining a red light duration; and the host vehicle having a best arrival time and an expected arrival time for passing through each of the one or more points, wherein a time difference exists between each of the best arrival times and the corresponding expected arrival time, and each of the time differences is minimized based on the at least one first arrival time, the at least one second arrival time and the red time duration; and a speed adjusting step, wherein a speed of the host vehicle is adjusted or maintained based on the expected arrival times.

2. The intersection speed deciding method of claim 1, wherein, in the dataset obtaining and calculating step, whether the host vehicle is turning or not is judged, if the host vehicle is turning and the at least one approaching vehicle goes straight as a straight vehicle, a third arrival time is defined as the first arrival time of the straight vehicle, and each of the time differences is minimized based on the at least one first arrival time, the at least one second arrival time, the third arrival time and the red time duration.

3. The intersection speed deciding method of claim 2, wherein, in the dataset obtaining and calculating step, the following equations is applied:

$$\min_{AT_i, i=1,\ldots,W} \sum_{i=1}^{W} |AT_i - OT_i|;$$

subject to $|(OT_i + |AT_i - OT_i|) - AT_j I_{jw}| \geq \Delta t_w I_{jw};$ $(OT_i + |AT_i - OT_i|) - AT_k I_{kF} \geq \Delta t_F I_{kF};$ $(OT_i + |AT_i - OT_i|) - AT_p I_p \geq 0;$ and $OT_i + |AT_i - OT_i| - t_{redlight} I_{redlight} \geq 0;$ wherein i is an integer between 1 to W, W represents a number of the one or more points, $OT_i$ represents each of the best arrival times, $AT_i$ presents each of the expected arrival times, w is an integer between 1 to W, $I_{jw}$ represents an event corresponding to each of the one or more vehicles, wherein $I_{jw}=1$ is given to one of the at least one approaching vehicle which is not going straight, and $I_{jw}=0$ is given to the straight vehicle and the others of the one or more vehicles not expected to passing through at least one of the one or more points, $AT_j$ represents the at least one first arrival time, $I_{kF}$ represents an event corresponding to the preceding vehicle, wherein $I_{kF}=1$ as long as the preceding vehicle is presented, and $I_{kF}=0$ as long as the preceding vehicle is absent, $I_p$ represents an event corresponding to the straight vehicle, wherein $I_p=1$ as long as the straight vehicle is presented, and $I_p=0$ as long as the straight vehicle is absent, $AT_p$ represents the third arrival time, $t_{redlight}$ represents the red time duration, $I_{redlight}$ represents an event corresponding to the red light, wherein $I_{redlight}=1$ as long as the host vehicle is expected to wait for the red light, and $I_{redlight}=0$ as long as the host vehicle is not expected to wait for the red light, and $\Delta t_w$ and $\Delta t_F$ represent a first interval time and a second interval time, respectively.

4. The intersection speed deciding method of claim 3, wherein $\Delta t_w = \max(L_i, L_j)/V_i$ and $\Delta t_F = \max(L_i, L_F)/V_i$ are satisfied, wherein $L_i$ represents a length of the host vehicle, $L_j$ represents a length of the at least one approaching vehicle, $L_F$ represents a length of the preceding vehicle, and $V_i$ represents the speed of the host vehicle.

5. The intersection speed deciding method of claim 4, wherein, in the dataset obtaining and calculating step, the host vehicle starts to obtain the at least one first arrival time, the at least one second arrival time, the third arrival time and the red time duration 200 m from the intersection.

6. The intersection speed deciding method of claim 5, wherein, in the speed adjusting step, as long as the expected arrival time of one of the one or more points is larger than the corresponding best arrival time, the host vehicle decelerates at 10.58 km/(hr·s) until the host vehicle has passed through the one of the one or more points or until the speed of the host vehicle becomes zero.

7. The intersection speed deciding method of claim 1, wherein, in the dataset obtaining and calculating step, the host vehicle receives an environment signal by a receiver, and the environment signal comprises the at least one first arrival time, the at least one second arrival time and the red time duration.

8. The intersection speed deciding method of claim 1, wherein, in the dataset obtaining and calculating step, the host vehicle obtains the at least one first arrival time, the at least one second arrival time and the red time duration via at least one sensor.

9. The intersection speed deciding method of claim 1, wherein a controlling unit of the host vehicle receives a turning signal to judge whether the host vehicle is turning.

10. The intersection speed deciding method of claim 1, wherein the intersection is cross-shaped, Y-shaped or T-shaped.

11. An intersection speed deciding system, which is applied to the intersection speed deciding method of claim 1 and comprises:
 a controlling unit disposed at the host vehicle; and
 a receiver disposed at the host vehicle and signally connected to the controlling unit, the receiver configured for receiving an environment signal from a V2X communication system, wherein the environment signal comprises the at least one first arrival time, the at least one second arrival time and the red time duration.

12. An intersection speed deciding system, which is applied to the intersection speed deciding method of claim 1 and comprises:
 a controlling unit disposed at the host vehicle; and
 at least one sensor disposed at the host vehicle and signally connected to the controlling unit, the at least one sensor detecting the at least one approaching vehicle, the preceding vehicle and the red light to allow the controlling unit to obtain the at least one first arrival time, the at least one second arrival time and the red time duration.

* * * * *